US012640983B2

(12) United States Patent
Zhang et al.

(10) Patent No.: US 12,640,983 B2
(45) Date of Patent: May 26, 2026

(54) DEVICE MANAGEMENT METHOD AND NETWORK DEVICE

(71) Applicant: New H3C Technologies Co., Ltd., Hangzhou (CN)

(72) Inventors: Siyu Zhang, Beijing (CN); Xiaolong Liu, Beijing (CN); Xuezhi Tao, Beijing (CN); Lei Wu, Beijing (CN); Yun Zhao, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 84 days.

(21) Appl. No.: 18/714,981

(22) PCT Filed: Jul. 22, 2022

(86) PCT No.: PCT/CN2022/107456

§ 371 (c)(1),
(2) Date: May 30, 2024

(87) PCT Pub. No.: WO2024/016333

PCT Pub. Date: Jan. 25, 2024

(65) Prior Publication Data

US 2025/0023773 A1　　Jan. 16, 2025

(51) Int. Cl.
H04L 41/0806 (2022.01)
H04W 48/16 (2009.01)
H04W 52/02 (2009.01)

(52) U.S. Cl.
CPC ......... H04L 41/0806 (2013.01); H04W 48/16 (2013.01); H04W 52/0212 (2013.01)

(58) Field of Classification Search
CPC .. H04L 41/0806; H04L 67/34; G06F 9/44505
See application file for complete search history.

(56) References Cited

U.S. PATENT DOCUMENTS

2013/0083691 A1　4/2013　Murphy et al.
2014/0328190 A1　11/2014　Lord et al.
(Continued)

FOREIGN PATENT DOCUMENTS

CN　　103188766　　7/2013
CN　　107809367　　3/2018
(Continued)

OTHER PUBLICATIONS

Extended European Search Report issued in corresponding European Application No. 22951602.6, dated Jan. 17, 2025.
(Continued)

*Primary Examiner* — Esther B. Henderson
(74) *Attorney, Agent, or Firm* — NORTON ROSE FULBRIGHT US LLP

(57) ABSTRACT

A device management method and a network device are disclosed. The method includes: when the first device is a master device, the network support module of the first device receiving a discovery request sent by the network support module of a second device, wherein the discovery request includes target device information; the network support module of the first device sending a management notification to the network support module of the second device, and sending a join event to the network service module of the first device; the network service module of the first device sending first configuration information matching the target device information to the network support module of the first device; the network support module of the first device sending the first configuration information to the network service module of the second device; the network service module of the second device performing configuration by using the first configuration information.

13 Claims, 6 Drawing Sheets

(56)                    References Cited

U.S. PATENT DOCUMENTS

| | | | |
|---|---|---|---|
| 2015/0207677 A1 | 7/2015 | Choudhury et al. | |
| 2018/0184296 A1 | 6/2018 | Hunt et al. | |
| 2021/0021494 A1 | 1/2021 | Yao et al. | |
| 2024/0373495 A1* | 11/2024 | Wang ................... | H04W 76/15 |

FOREIGN PATENT DOCUMENTS

| | | |
|---|---|---|
| CN | 111327483 | 6/2020 |
| CN | 112333000 | 2/2021 |
| CN | 112437467 | 3/2021 |
| CN | 112583618 | 3/2021 |
| JP | 2018085060 B4 | 5/2018 |
| WO | WO 2021/022806 | 2/2021 |
| WO | WO 2021/147358 | 7/2021 |

OTHER PUBLICATIONS

Office Action issued in corresponding Japanese Application No. 2024-536033, dated Jun. 10, 2025 (English Translation provided).
International Search Report and Written Opinion issued in Corresponding PCT Application No. PCT/CN2022/107456, dated Nov. 30, 2022 (English Translation provided).
Droms, R. "Dynamic Host Configuration Protocol." Bucknell University, Mar. 31, 1997, https://www.rlc-editor.org/rlc/rfc2131.
Notice of Allowance issued in corresponding Chinese Application No. 202280002357.6, dated Mar. 18, 2026 (Machine Translation provided).
Notice of Allowance issued in corresponding Singapore Application No. 11202403701Q, dated Jan. 26, 2026.

\* cited by examiner

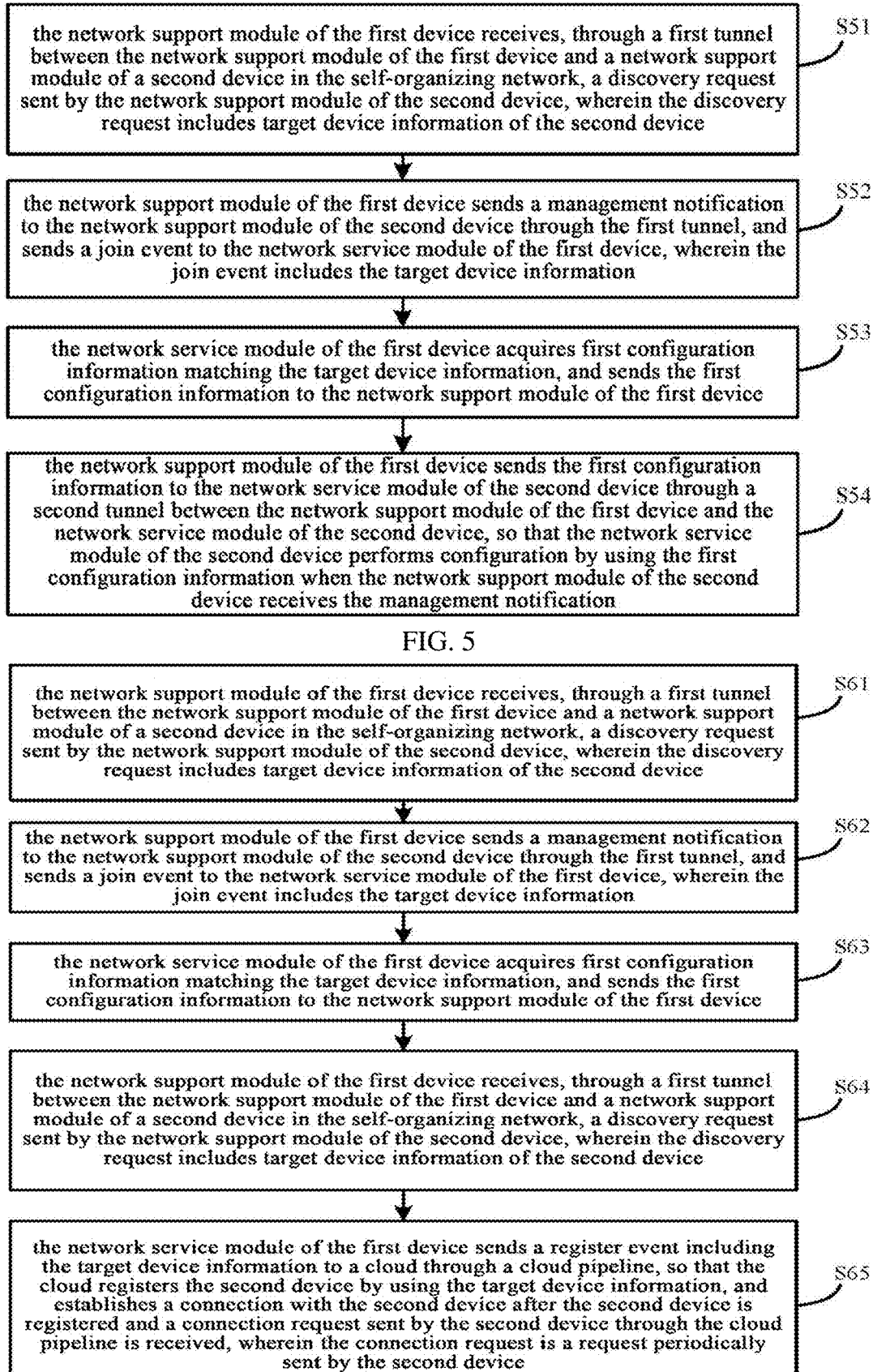

the network support module of the first device receives, through a first tunnel between the network support module of the first device and a network support module of a second device in the self-organizing network, a discovery request sent by the network support module of the second device, wherein the discovery request includes target device information of the second device —S51 the network support module of the first device sends a management notification to the network support module of the second device through the first tunnel, and sends a join event to the network service module of the first device, wherein the join event includes the target device information —S52 the network service module of the first device acquires first configuration information matching the target device information, and sends the first configuration information to the network support module of the first device —S53 the network support module of the first device sends the first configuration information to the network service module of the second device through a second tunnel between the network support module of the first device and the network service module of the second device, so that the network service module of the second device performs configuration by using the first configuration information when the network support module of the second device receives the management notification —S54

FIG. 5 the network support module of the first device receives, through a first tunnel between the network support module of the first device and a network support module of a second device in the self-organizing network, a discovery request sent by the network support module of the second device, wherein the discovery request includes target device information of the second device —S61 the network support module of the first device sends a management notification to the network support module of the second device through the first tunnel, and sends a join event to the network service module of the first device, wherein the join event includes the target device information —S62 the network service module of the first device acquires first configuration information matching the target device information, and sends the first configuration information to the network support module of the first device —S63 the network support module of the first device receives, through a first tunnel between the network support module of the first device and a network support module of a second device in the self-organizing network, a discovery request sent by the network support module of the second device, wherein the discovery request includes target device information of the second device —S64 the network service module of the first device sends a register event including the target device information to a cloud through a cloud pipeline, so that the cloud registers the second device by using the target device information, and establishes a connection with the second device after the second device is registered and a connection request sent by the second device through the cloud pipeline is received, wherein the connection request is a request periodically sent by the second device —S65

FIG. 6

New device                                                     Master device

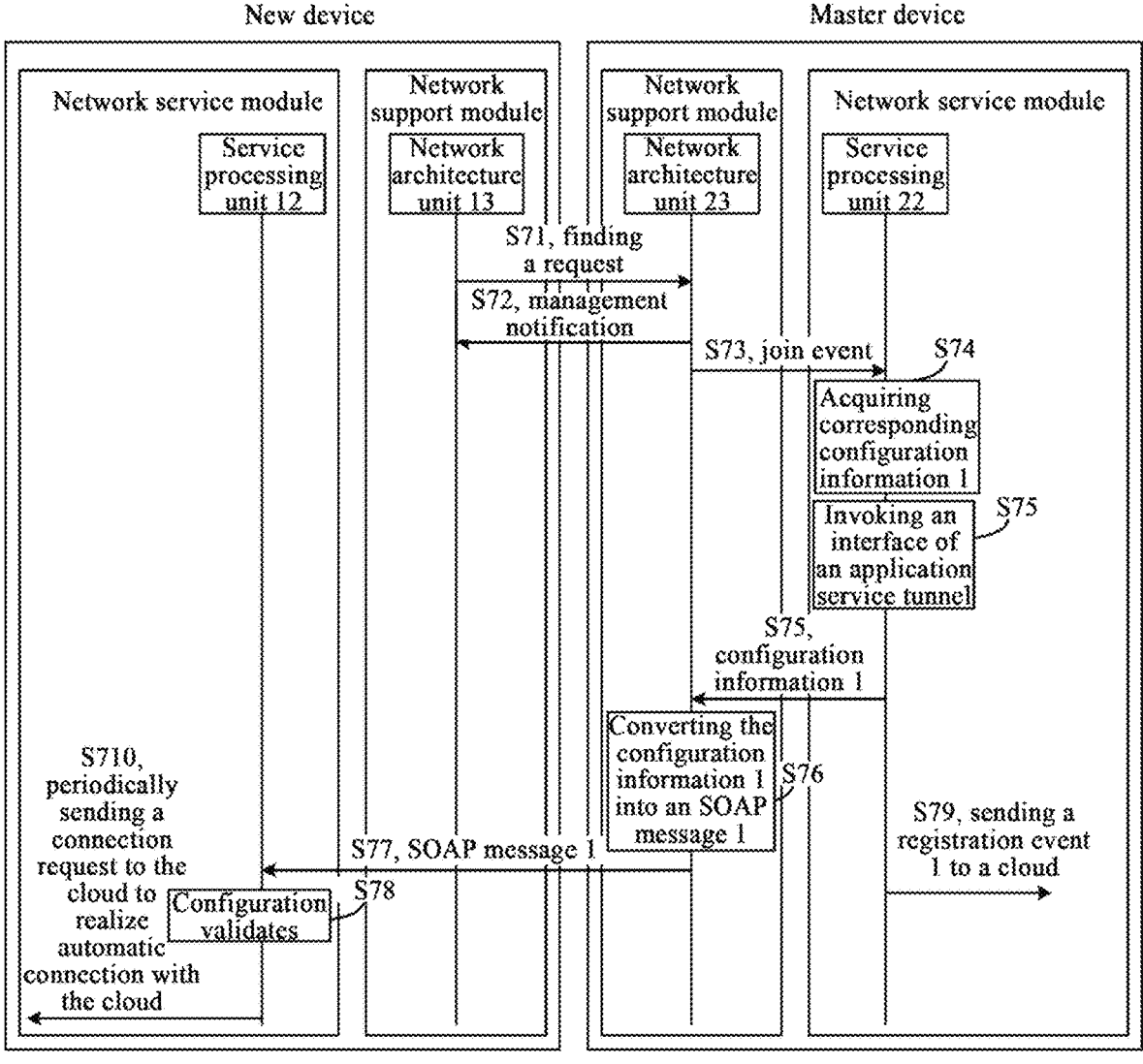

FIG. 7 the network service module of the first device sends target page data provided by a network interaction module of the first device to the user terminal, so that the user terminal displays the target page data and performs an operation on the target page data to obtain second configuration information for the second device    S81 the network service module of the first device receives the second configuration information sent by the user terminal, and sends the second configuration information to the network support module of the first device    S82 the network support module of the first device sends the second configuration information to the network service module of the second device through the second tunnel, so that the network service module of the second device performs configuration by using the second configuration information    S83

FIG. 8

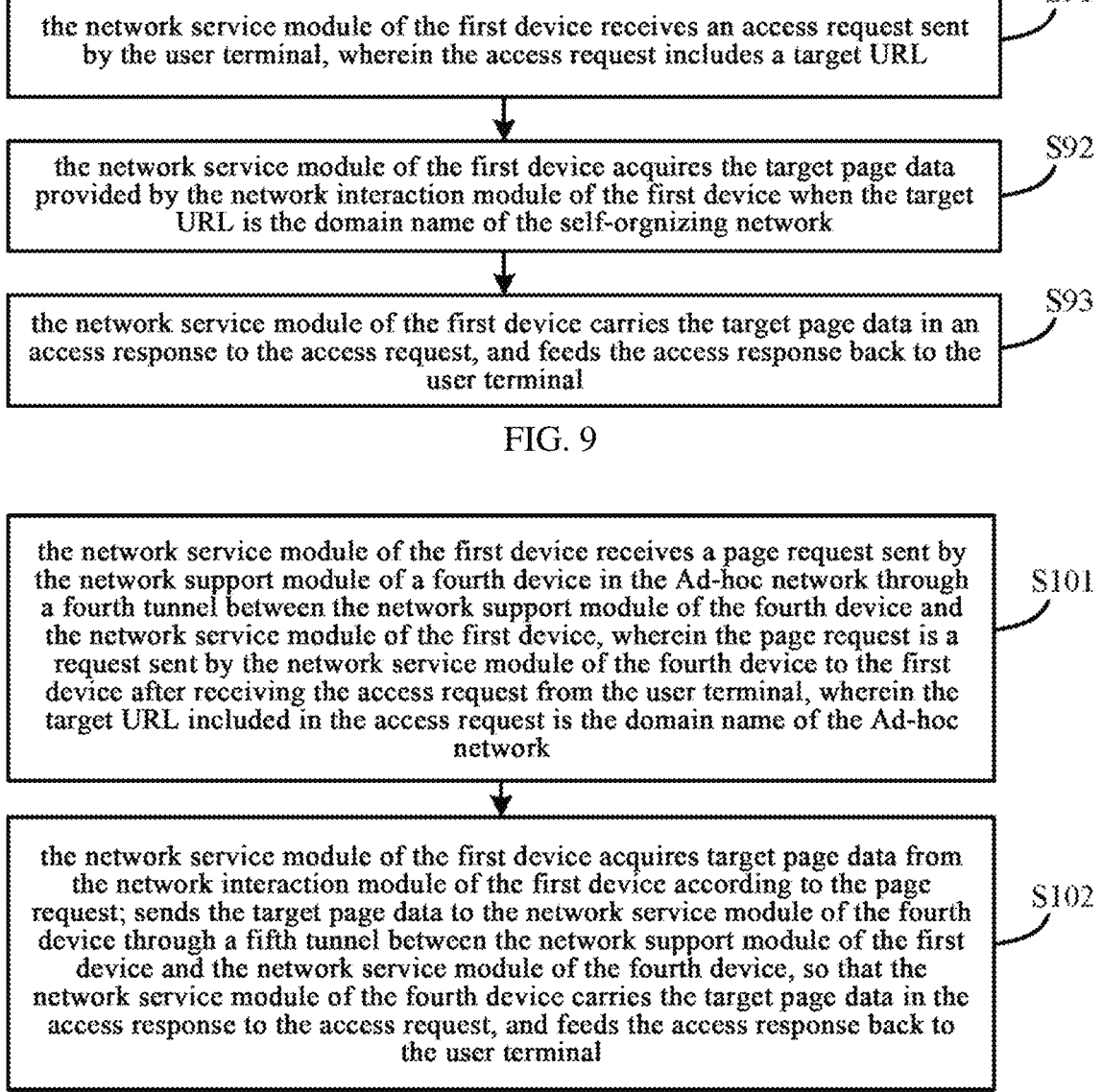

the network service module of the first device receives an access request sent by the user terminal, wherein the access request includes a target URL

S91 the network service module of the first device acquires the target page data provided by the network interaction module of the first device when the target URL is the domain name of the self-orgnizing network

S92 the network service module of the first device carries the target page data in an access response to the access request, and feeds the access response back to the user terminal

S93

FIG. 9 the network service module of the first device receives a page request sent by the network support module of a fourth device in the Ad-hoc network through a fourth tunnel between the network support module of the fourth device and the network service module of the first device, wherein the page request is a request sent by the network service module of the fourth device to the first device after receiving the access request from the user terminal, wherein the target URL included in the access request is the domain name of the Ad-hoc network

S101 the network service module of the first device acquires target page data from the network interaction module of the first device according to the page request; sends the target page data to the network service module of the fourth device through a fifth tunnel between the network support module of the first device and the network service module of the fourth device, so that the network service module of the fourth device carries the target page data in the access response to the access request, and feeds the access response back to the user terminal

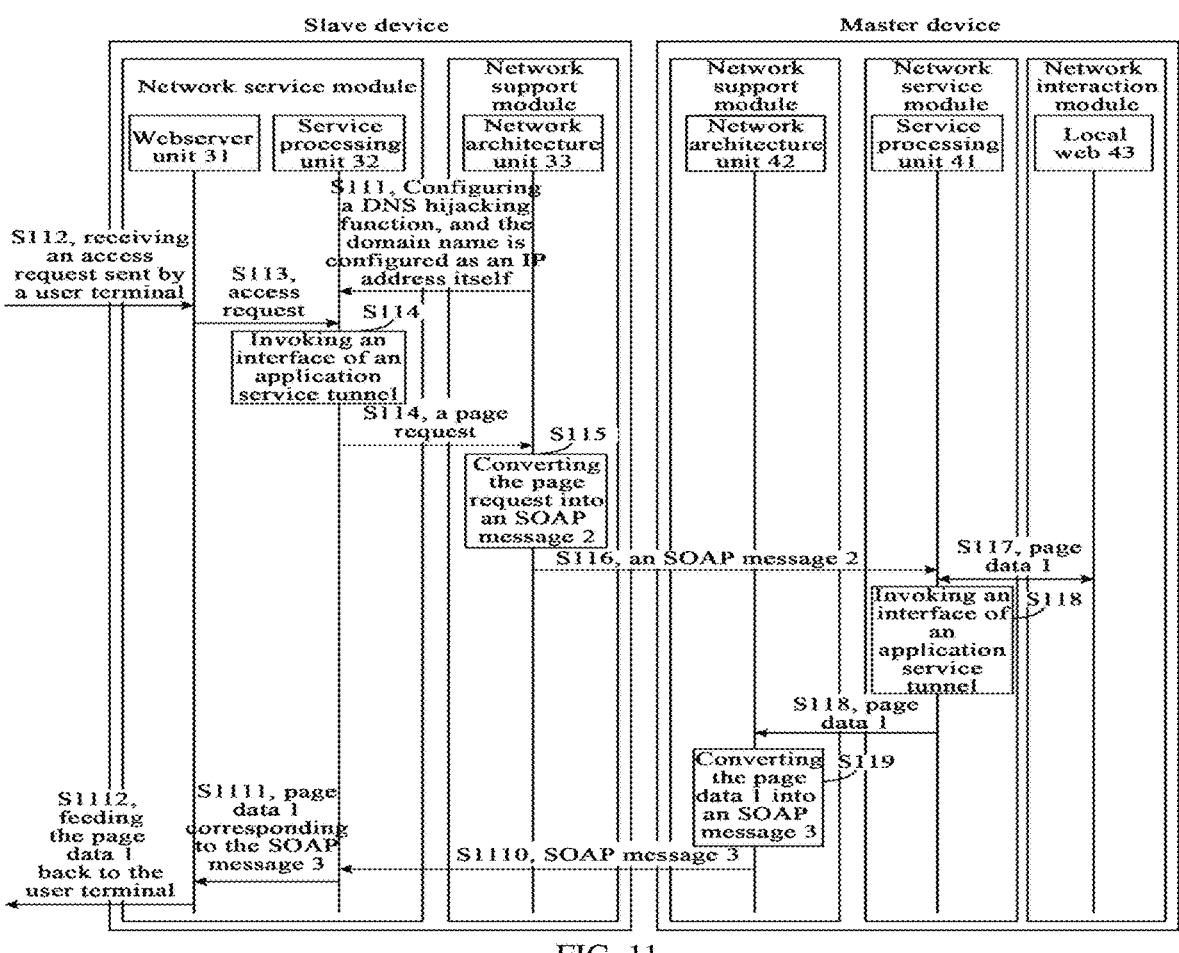
FIG. 11
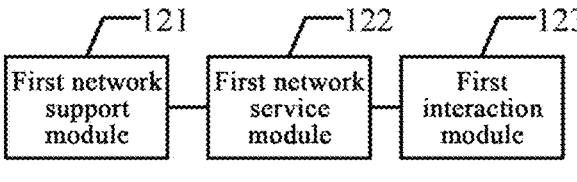
FIG. 12
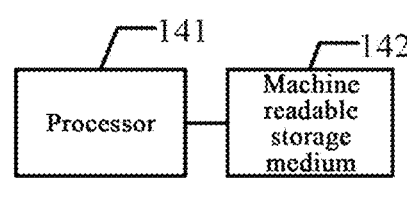
FIG. 13
FIG. 14

DEVICE MANAGEMENT METHOD AND NETWORK DEVICE

CROSS REFERENCE TO RELATED APPLICATION

The present application is a national phase application under 35 U.S.C. § 371 of International Application No. PCT/CN2022/107456, filed Jul. 22, 2022, the entire contents of which are incorporated herein by reference in their entirety.

TECHNICAL FIELD

The present disclosure relates to the technical field of communications, and in particular, to a device management method and a network device.

BACKGROUND

In order to reduce the cost and improve the security of a self-organizing network, an application (APP) for mobile terminals is often used to manage the self-organizing network. For users, the cost of the self-organizing network using the APP for mobile terminals is low, but it cannot be on duty on the network 24 hours a day.

SUMMARY

The purpose of the examples of the present disclosure is to provide a device management method and apparatus, so as to solve the problem of being unable to be on duty on the network 24 hours a day, and to realize the automatic management of devices and the management of the entire network. Specifically, the technical solutions are as follows.

In a first aspect, an example of the present disclosure provides a device management method, which is applied to a first network device in a self-organizing network and includes:

when the first device is a master device, a network support module of the first device receiving, through a first tunnel between the network support module of the first device and a network support module of a second device in the self-organizing network, a discovery request sent by the network support module of the second device, wherein the discovery request includes target device information of the second device;

the network support module of the first device sending a management notification to the network support module of the second device through the first tunnel, and sending a join event to a network service module of the first device, wherein the join event includes the target device information;

the network service module of the first device acquiring first configuration information matching the target device information, and sending the first configuration information to the network support module of the first device;

the network support module of the first device sending the first configuration information to a network service module of the second device through a second tunnel between the network support module of the first device and the network service module of the second device, so that the network service module of the second device performs configuration by using the first configuration information when the network support module of the second device receives the management notification.

In a second aspect, an example of the present disclosure provides a network device, which includes a first network support module and a first network service module;

the first network support module is to: when the network device is a master device of a self-organizing network, receive, through a first tunnel between first network support module and a network support module of a second device in the self-organizing network, a discovery request sent by the network support module of the second device, wherein the discovery request includes target device information of the second device;

the first network support module is to send a management notification to the network support module of the second device through the first tunnel, and send a join event to the first network service module, wherein the join event includes the target device information;

the first network service module is to acquire first configuration information matching the target device information, and send the first configuration information to the first network support module;

the first network support module is to send the first configuration information to a network service module of the second device through a second tunnel between first network support module and the network service module of the second device, so that the network service module of the second device performs configuration by using the first configuration information when the network support module of the second device receives the management notification.

In a third aspect, an example of the present disclosure provides a network device, including a processor and a machine-readable storage medium, where the machine-readable storage medium stores machine executable instructions that can be executed by the processor and cause the processor to implement any of the method provided in the first aspect.

In a fourth aspect, an example of the disclosure provides a machine-readable storage medium storing a computer program thereon which, when executed by a processor, causes the processor to implement any of the method provided by the first aspect.

In a fifth aspect, an example of the present disclosure provides a computer program which, when executed by a processor, causes the processor to implement any of the method provided by the first aspect.

In the technical solutions provided by the examples of the present disclosure, after a new device accesses the network when powered on, the interaction between the network support module of the new device and the network support module of the master device and the interaction between the network support module and the network service module of the master device realizes the automatic management and automatic synchronization configuration of the new device, which solves the problem of being unable to be on duty on the network 24 hours a day. In addition, since the master device manages all slave devices, such as new devices, after a user terminal accesses the network through any device, it can access the master device and manage all devices in the entire network, realizing the management of the entire network.

BRIEF DESCRIPTION OF THE DRAWINGS

In order to more clearly describe the technical solution of the examples of the present disclosure and the prior art, drawings needed in the examples and the prior art will be briefly described below. Obviously, the drawings described below are for only some examples of the present disclosure, one of ordinary skills in the art can also obtain other drawings based on these drawings without any creative efforts.

FIG. 5 is a first schematic flow chart of a device management method according to an example of the present disclosure;

FIG. 6 is a second schematic flow chart of a device management method according to an example of the present disclosure;

FIG. 7 is a signaling diagram for automatic management, configuration synchronization and cloud connection according to an example of the present disclosure;

FIG. 8 is a third schematic flow chart of a device management method according to an example of the present disclosure;

FIG. 9 is a first schematic flow chart of an interface access method according to an example of the present disclosure;

FIG. 10 is a second schematic flow chart of an interface access method according to an example of the present disclosure;

FIG. 11 is a signaling diagram of a slave device accessing a web page of a master device according to an example of the present disclosure;

FIG. 12 is a first schematic structural diagram of a network device according to an example of the present disclosure;

FIG. 13 is a second schematic structural diagram of a network device according to an example of the present disclosure;

FIG. 14 is a third schematic structural diagram of a network device according to an example of the present disclosure.

DETAILED DESCRIPTION

In order to make objectives, technical solutions and advantages of the present disclosure more apparent, the present disclosure now will be described in detail with reference to the accompanying drawings and the examples. Obviously, the examples described are only some of the examples of the present disclosure instead of all the examples. All other examples obtained by those of ordinary skill in the art based on the examples of the present disclosure without any creative efforts are within the scope of the present disclosure.

A self-organizing network is a network that combines mobile communications and a computer network. The information exchange of this network adopts a packet switching mechanism in the computer network.

Plug-and-play means that a device can access (i.e., join) the network after it is powered on.

Figures 1, 2A, 2B:
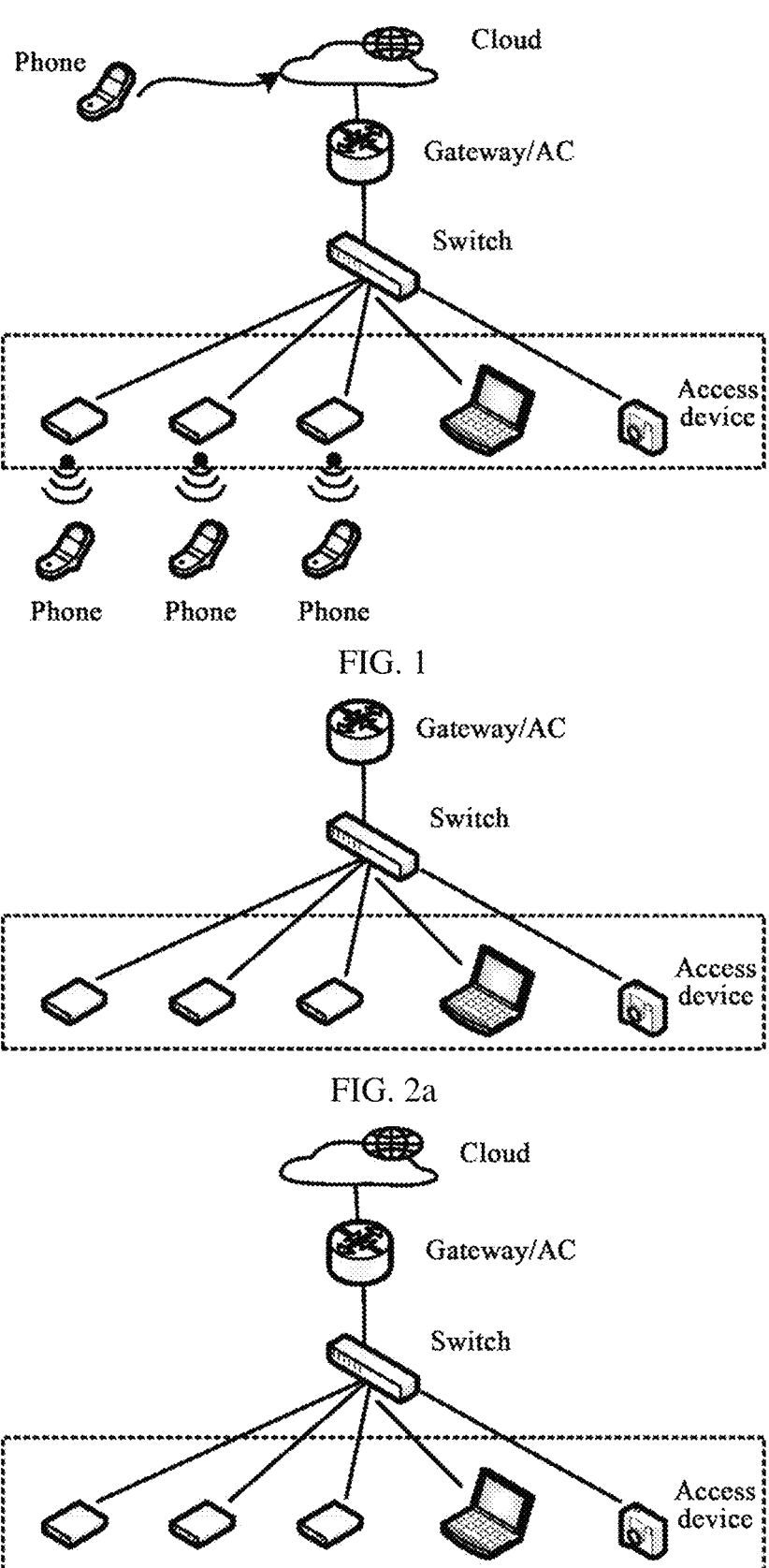
FIG. 1 is a schematic diagram of an architecture of a self-organizing network.
FIG. 2a is a schematic diagram of a device management system without a cloud according to an example of the present disclosure.
FIG. 2b is a schematic diagram of a device management system with a cloud according to an example of the present disclosure.

In scenarios such as villas, commercial chains, business hotels, and government and enterprise offices, the self-organizing network is often used for networking. In the architecture diagram of the self-organizing network as shown in FIG. 1, various access devices access the network through a gateway or an AC (Access Controller), and mobile computers, PCs (Personal Computers) and other user terminals access the network over an access device. Wherein, access devices can be APs (Access Points), switching devices, routers, etc. APs are further divided into Fit APs and Fat APs. In the self-organizing network in the aforementioned scenario, since there are few access devices, it is low-end small-scale networking.

In the context of digital transformation, the industry competition in the low-end small-scale networking market has intensified. Network manufacturers have successively introduced the whole network management architecture that supports low-end small-scale networking. In their respective network products, the whole network management architecture has functions of automatic discovery of new access devices, unified management of all access devices in the networking, automatic configuration of new access devices, etc. These functions have brought about the improvement in the usability, such as simplified start-up, convenient management, and logic automation, which have brought tangible benefits to non-professional users and are widely accepted by the market.

The low-end small-scale networking market is very sensitive to the price. In order to reduce the cost of self-organizing network, public cloud and application (APP) for the mobile terminal are often used to manage self-organizing networks. For users, the cost of the self-organizing network using the public cloud and the APP for the mobile terminal is low, but due to the reliability of the public cloud itself and the reliability of the network between the self-organizing network and the public cloud, the reliability of the solution using the public cloud to manage the self-organizing network is poor, and the public cloud can only be used after the local network is built, which leads to a smaller application scope of the solution using the public cloud to manage the self-organizing network. The APP for mobile terminal can avoid the above reliability problems, but it cannot be on duty 24 hours a day.

In order to solve the problem of being unable to be on duty on the network 24 hours a day and realize automatic management of devices, an example of the present disclosure provides a device management system, which includes multiple devices, and the multiple devices may include but are not limited to Fat APs, Fit APs, switching devices, routers, gateways, and ACs, etc.

In order to meet the requirement of reducing the cost of a self-organizing network, the AC can be used as a gateway in the device management system, or the functions of the AC can be incorporated into network devices such as gateways, routers, or switching devices. In addition, the AC can be connected with Fit AP or other managed APs to expand the coverage area of the self-organizing network.

In the device management system, for devices with high hardware configuration and performance, such as the aforementioned Fat AP, switching devices, routers, gateways, and ACs, etc., it is necessary to assume the role of a controller to support the device management method provided by the examples of the present disclosure. The device management method will be described in detail later, and will not be introduced here. In the examples of the present disclosure, devices such as Fat APs, switching devices, and routers can all assume the role of the controller. Therefore, in the examples of the present disclosure, it is not necessary to provide wireless controllers such as gateways and ACs, and supporting the self-organizing network of the Fat AP+switching device can effectively reduce the cost of self-organizing networks.

For devices with lower hardware configuration and performance, such as the aforementioned Fit AP or other managed APs, the management method of devices provided by the examples of the present disclosure can be performed by the management of devices supporting the role of the aforementioned controller.

The device management system provided by the example of the present disclosure may adopt a self-organizing network without a cloud, as shown in FIG. 2a. In the self-organizing network, APPs, browsers, etc. are connected to the local network to manage each of devices in the self-organizing network. APPs, browsers, etc. can be installed on mobile phones, personal computers and other devices, and the local network is a self-organizing network.

The device management system provided by the example of the present disclosure may adopt a self-organizing network with a cloud. As shown in FIG. 2b, in the self-organizing network, after the local network is connected to the cloud, the APP can remotely operate the local network through the cloud, and then manage each of devices in the self-organizing network.

Figure 3:
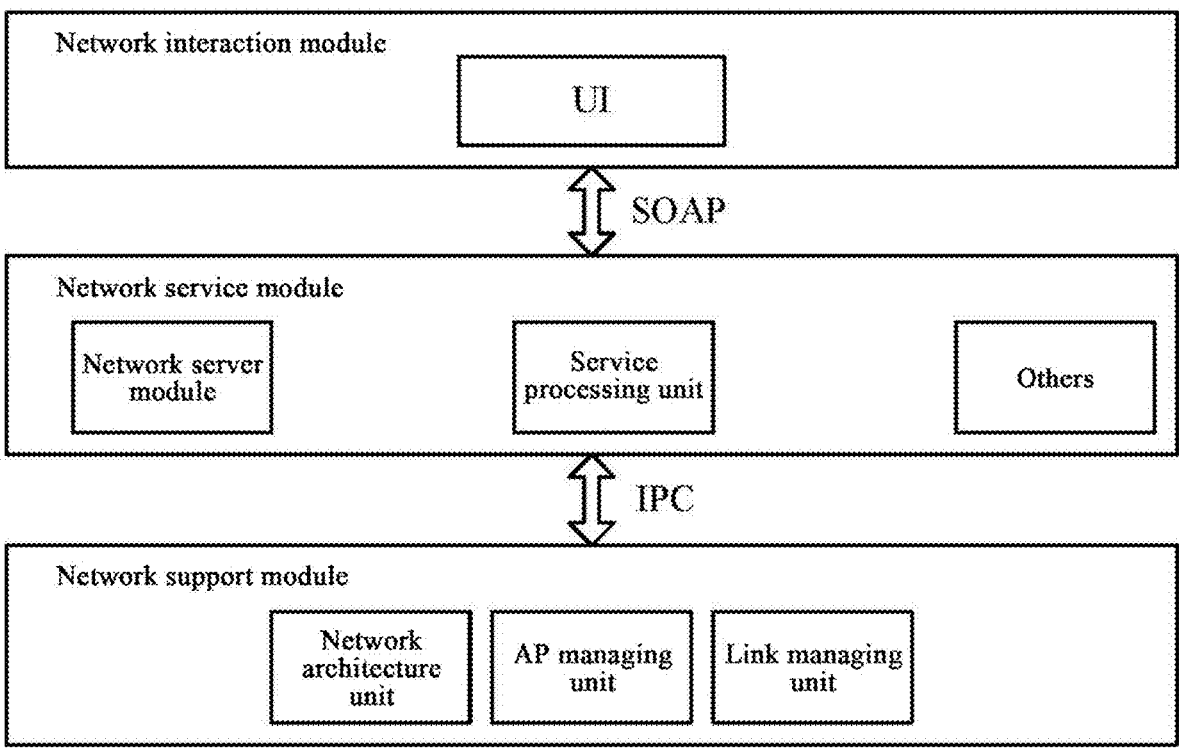
FIG. 3 is a schematic diagram of a three-layer architecture with a network device according to an example of the present disclosure.

In this example of the present disclosure, the device in the device management system may include three modules, as shown in FIG. 3, which are a network interaction module, a network service module, and a network support module, respectively. The network interaction module, network service module and network support module are described in detail below.

(1) The network interaction module provides the user terminal with a UI (User Interface) for operation, and provides the user terminal with a data channel for communications between front-end and back-end. The UI may include, but is not limited to, a mobile browser page, a mobile APP page, and the like. The front-end refers to a network interaction module, and the back-end refers to a network service module.

The data channel for communications between the front-end and the back-end can use an SOAP (Simple Object Access Protocol) protocol framework, and use a network configuration protocol interface (such as a netconf interface) as a message format to realize the communications between the front-end and the back-end.

(2) The network service module is used to realize various service logics such as whole network management and plug-and-play. Here, the service logic may include a global wireless service validating logic, a global wired service validating logic, a new device network access automatic cloud connection logic, a VLAN (Virtual Local Area Network) automatic adaptation logic of an Ethernet port, and an automatic synchronization configuration logic, etc.

In order to facilitate the realization of various service logics by the network service module, the network service module may include a Webserver unit and a service processing unit, etc. The network service module may be associated with a network configuration protocol interface and cloud pipeline, etc., so as to facilitate communications with the network interaction module, the network support module and the cloud. For ease of description, the following descriptions are given by taking the network configuration protocol interface as the netconf interface as an example.

Wherein, the Webserver unit receives an SOAP message from the front-end, and the netconf interface distributes the SOAP message to a corresponding service process for processing according to the actual service of the interface.

Such communications can be used for data communications between the front-end, the back-end and devices. Considering high coupling between the Webserver unit and the service processing unit, in the examples of the present disclosure, the Webserver unit, the service processing unit and other processing units of the service logic may be placed together in the network service module.

The service processing unit processes plug-and-play automatic synchronization configuration, automatic cloud connection, a global wireless service validating logic, a VLAN automatic adaptation logic of an Ethernet port, a global wired service validating logic and other service logic, and stores the service configuration of the entire self-organizing network, and maintains service data.

The cloud pipeline is used to realize the communications between the device and the management cloud, and at the same time assume a function of plug-and-play automatic cloud connection. The cloud pipeline is a connection established between the network service module of the network device and the cloud. Wherein, the management cloud is the cloud.

(3) The network support module is responsible for supporting the network architecture of the self-organizing network, and is used to implement functions such as device role election, master-slave device relationship maintenance, entire network topology maintenance, and maintenance of data channels for communications between devices.

In order to facilitate the network support module to implement various functions, the network support module may include a network architecture unit, an AP management unit, a link management unit, and the like.

The network architecture unit is responsible for functions such as automatic discovery and automatic networking of devices, self-election role determination of a master device, and automatic management of new devices. The network architecture unit can provide a unified service delivery and information acquisition channel for the network service module. At the same time, the network architecture unit can also store and maintain the master-slave information and topology relationship of devices in the network.

After the device is powered on, the network architecture unit can initiate a second-layer (i.e., a data link layer) negotiation and determine its own role based on a current network environment. For example, if the network is still in a construction stage, the device participates in the election of the master device, and decides its own working mode according to the election result, that is, determines the role of the device as the master device or the slave device; if the network is already in normal working state, that is, the network has been started, the device initiates a process of joining the network. The process of joining the network will be described in detail later, and will not be described here.

A link management unit is responsible for notifying and collecting neighbor relationships, so that the network architecture unit can draw the topology of the entire network. In this example of the present disclosure, the link management unit may be an LLDP (Link Layer Discovery Protocol) unit, or may be another link protocol unit, which is not limited.

The AP management unit is used to manage Fit AP or other managed APs.

There are user mode services and kernel mode services in the network service module and network support module of a device. For a user mode service, it can be implemented through IPC (Inter-Process Communication) communications; for a kernel mode service, it can be implemented through an interface invocation inside the kernel mode. FIG. 3 only shows that the services in the network service module and the network support module are implemented through IPC communications, which is not limited herein. The service processing unit of the network service module focuses on maintaining service data, and the network architecture unit of the network support module focuses on maintaining data such as a management relationship between the master device and the slave device in the network and network topology information.

Figure 4:
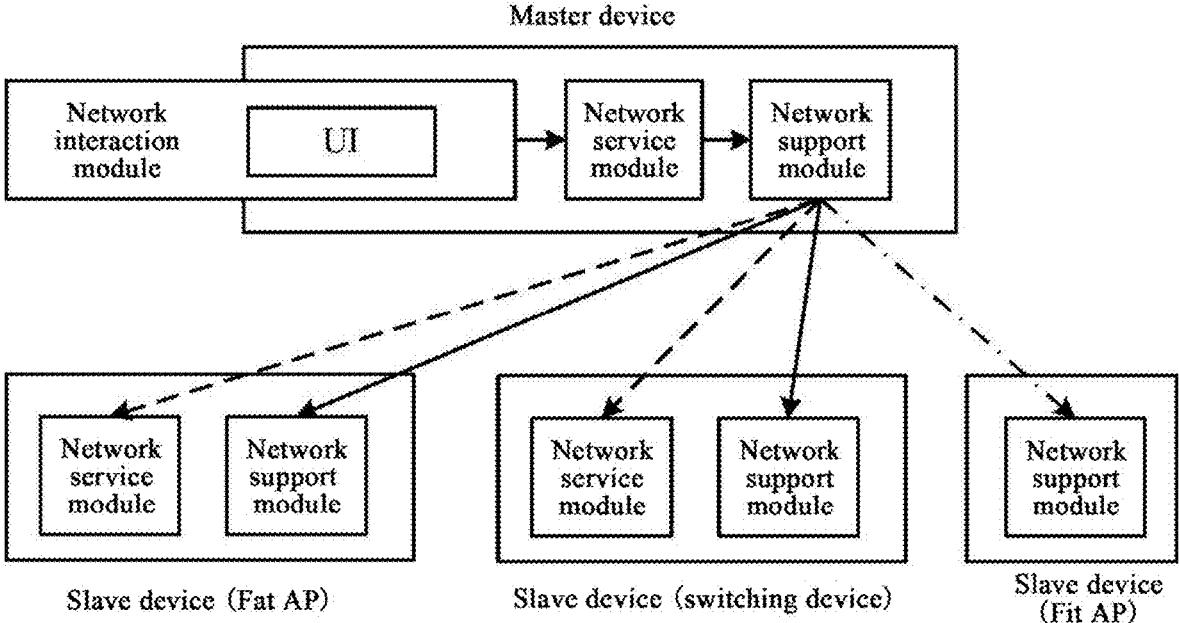
FIG. 4 is a schematic diagram of three types of tunnels according to an example of the present disclosure.

In order to realize communications between devices, the network support module in the example of the present disclosure provides three types of tunnels for communications between devices, as shown in FIG. 4.

(1) The first type of tunnel, which can be called a network architecture tunnel, as shown by the solid line in FIG. 4.

The network architecture tunnel works at a link layer and mainly serves the network support module, which is specifically as the network architecture unit of the network support module. The network architecture tunnel is used for automatic discovery between the master device and slave devices, role election, master-slave device relationship maintenance, slave device join response, master slave device keeping alive, etc.

The network architecture tunnel is built between network support modules of different devices. When the slave device is managed by the master device, a network architecture tunnel is established between the slave device and the master device, and the network architecture tunnel is kept alive continuously. The master device and slave device judge whether the other one of them is on the network according to a keep-alive situation of the network architecture tunnel.

(2) The second type of tunnel, which can be called an application service tunnel, as shown by the dotted line in FIG. 4.

The application service tunnel is built between the network support module and the network service module of different devices. It is packaged into a logical tunnel upwards, that is, when facing the network service module of the device, the application service tunnel is packaged as a logical tunnel, and the network service module invokes the interface provided by the application service tunnel to send messages to other devices; a general mechanism of the existing network device is reused downwards, that is, when facing the target device for the data being sent, the application service tunnel reuses the general mechanism of the existing network device, and SOAP and other methods are used to send messages.

For example, before sending data, the network service module invokes the interface of the application service tunnel to send the message to the network architecture unit in the network support module. The network architecture unit converts the message into an SOAP message and sends it to a target device. The target device is a receiving device, and the Webserver unit in the network service module of the receiving device receives the SOAP message, and transfers the SOAP message to a corresponding service processing unit for processing through the netconf interface.

In the example of the present disclosure, the application service tunnel is actually a logical link. Therefore, it is not needed to maintain a specific physical tunnel for a long time between devices, and SOAP may not maintain a long connection, which reduces the maintenance cost of the link. In addition, in the examples of the present disclosure, for communications between devices, the general mechanism of the network device is reused, which greatly reduces the implementation cost of the technical solutions provided in the examples of the present disclosure.

(3) The third type of tunnel, which can be called a wireless AP management tunnel, as shown by a dash-dotted line in FIG. 4.

The wireless AP management tunnel can reuse the existing AP management tunnel of the wireless product. In this way, it can be ensured that a Fit AP or other managed AP with less resources can implement the technical solutions provided by the examples of the present disclosure without increasing additional performance overhead.

The network interaction module, network service module and network support module shown in the aforementioned FIG. 3 constitute a three-layer architecture of the self-organizing network, and the first type of tunnel, the second type of tunnel and the third type of tunnel shown in the aforementioned FIG. 4 are three types of tunnels of the self-organizing network. Based on the device management system designed according to the three types of tunnels and the three-layer architecture, an example of the present disclosure provides a device management method, as shown in FIG. 5, which is applied to a first device in the self-organizing network. When the first device is a master device, the first device executes blocks S51-S54.

In some examples, the network support module of the first device in the self-organizing network performs a second-layer negotiation with the network support module of another device in the self-organizing network through a sixth tunnel between the network support module of the first device in the self-organizing network and the network support module of the another device in the self-organizing network, and determines the role of each of the first device and the another device in the self-organizing network through election, wherein the role is the master device or the slave device. Wherein, the sixth tunnel is a tunnel between the network support module of the first device and the network support module of the another device, that is, the sixth tunnel is the first type of tunnel, namely the network architecture tunnel.

In the example of the present disclosure, the master device in the self-organizing network is determined by election, and manages the devices in the network, which solves the problem regarding the usability such as automatic discovery and automatic management of devices in low-end small-scale networking, and plug-and-play of new devices, and login at one point to manage the whole network, while improving the efficiency of the start-up and the operation experience of the network management through login. This can effectively solve the problems such as the failure in automatic discovery and management and plug-and-play of new devices due to the downtime of devices that are always responsible to manage the network.

As shown in FIG. 5, the above device management method is as follows.

At block S51, the network support module of the first device receives, through a first tunnel between the network support module of the first device and a network support module of a second device in the self-organizing network, a discovery request sent by the network support module of the second device, wherein the discovery request includes target device information of the second device.

In the example of the present disclosure, the second device is a network device newly accessed to the self-organizing network, the first tunnel is a tunnel between the network support module of the first device and the network support module of the second device, that is, the first tunnel is the first type of tunnel described above, namely the network architecture tunnel. The target device information is the device information of the second device. The device information includes device type, serial number, MAC (Media Access Control) address, etc.

After the second device is powered on and accessed to the self-organizing network, the network support module of the second device sends a discovery request to the network support module of the first device through the first tunnel, wherein the discovery request includes the target device information. The network support module of the first device receives the discovery request sent by the network support module of the second device through the first tunnel.

With reference to the architecture of the self-organizing network shown in FIG. 3, at block S51, it may be that: the network architecture unit in the network support module of the second device sends a discovery request to the network support module of the first device through the first tunnel; and the network architecture unit in the network support module of the first device receives the discovery request sent by the network support module of the second device through the first tunnel.

At block S52, the network support module of the first device sends a management notification to the network support module of the second device through the first tunnel, and sends a join event to the network service module of the first device, wherein the join event includes the target device information.

After receiving the discovery request, the network support module of the first device sends a management notification to the network support module of the second device through the first tunnel to complete the automatic management of the second device. In this way, the second device successfully joins the self-organizing network, and the network support module of the first device and the network support module of the second device update networking data such as master-slave information and topology relationships, respectively.

In addition, after the management of the second device is completed, the network support module of the first device sends a join event to the network service module of the first device, so as to subsequently complete the synchronization configuration of the second device.

With reference to the architecture of the self-organizing network shown in FIG. 3, at block S52, it may be that: the network architecture unit in the network support module of the first device sends a management notification to the network support module of the second device through the first tunnel; and the network architecture unit in the network support module of the first device reports the join event to a service processing unit in the network service module of the first device.

At block S53, the network service module of the first device acquires first configuration information matching the target device information, and sends the first configuration information to the network support module of the first device.

After receiving the join event, the network service module of the first device extracts the target device information from the join event, and further acquires configuration information matching the target device information, such as first configuration information. The network service module of the first device sends the first configuration information to the network support module of the first device.

In some examples, configuration information about various device types is stored in the first device. In this case, the network service module of the first device acquiring the first configuration information matching the target device information at block S53 may be that: the network service module of the first device acquires the first configuration information matching the device type in the target device information.

With reference to the architecture of the self-organizing network shown in the aforementioned FIG. 3, at block S53, it may be that: after receiving the join event, the service processing unit in the network service module of the first device extracts the target device information from the join event, and then acquires the first configuration information matching the target device information. The service processing unit in the network service module of the first device sends the first configuration information to the network architecture unit in the network support module of the first device.

At block S54, the network support module of the first device sends the first configuration information to the network service module of the second device through a second tunnel between the network support module of the first device and the network service module of the second device, so that the network service module of the second device performs configuration by using the first configuration information when the network support module of the second device receives the management notification.

In the example of the present disclosure, the second tunnel is a tunnel between the network support module of the first device and the network service module of the second device, that is, the second tunnel is the second type of tunnel described above, namely an application service tunnel.

After receiving the first configuration information, the network support module of the first device sends the first configuration information to the network service module of the second device through the second tunnel. When the network support module of the second device receives the management notification, the network service module of the second device performs configuration by using the received first configuration information, thereby realizing automatic synchronization configuration of the second device.

With reference to the architecture of the self-organizing network shown in FIG. 3, at block S54, it may be that: the network architecture unit in the network support module of the first device sends first configuration information to the network service module of the second device through the second tunnel; and the service processing unit in the network service module of the second device performs configuration by using the first configuration information.

In the technical solutions provided by the examples of the present disclosure, after the new device is accessed to the network when powered on, the interaction between the network support module of the new device and the network support module of the master device and the interaction between the network support module and the network service module of the master device realizes the automatic management and automatic synchronization configuration of the new device, which solves the problem of being unable to be on duty on the network 24 hours a day. In addition, since the master device manages all slave devices, such as new devices, after an user terminal accesses the network through any device, it can access the master device and manage all devices in the entire network, realizing the management of the entire network.

In addition, the new device can perform automatic management and automatic synchronization configuration, which provides great convenience for users to expand the network and replace spare parts. At the same time, since the new device can be plugged and played when added to the network, there is no need to wait for all network devices to complete networking plug in and start-up when powered on, which provides greater flexibility for network start-up.

In some examples, in the above block S53 where the network service module of the first device sends the first configuration information to the network support module of the first device, it may be that: the network service module of the first device invokes the interface of the second tunnel to send the first configuration information to the network support module of the first device.

In this case, in the above block S54 where the network support module of the first device sends the first configuration information to the network service module of the second device through the second tunnel between the network support module of the first device and the network service module of the second device, it may be that: the network support module of the first device receives the first configuration information through the interface of the second tunnel between the network support module of the first device and the network service module of the second device; converts the first configuration information into a target message based on a preset protocol, and sends the target message to network service module of the second device. The preset protocol may be a general protocol between network devices, such as SOAP, etc.

When the network support module of the second device receives the management notification, the network service module of the second device converts the target message into the first configuration information, and performs configuration by using the first configuration information.

With reference to the architecture of the self-organizing network as shown in FIG. 3, the service processing unit in the network service module of the first device invokes the interface of the second tunnel to send the first configuration information to the network support module of the first device. The network architecture unit of the network support module of the first device receives the first configuration information through the interface of the second tunnel; converts the first configuration information into an SOAP target message, and sends the target message to the network service module of the second device. The Webserver unit in the network service module of the second device receives the target message, and transfers the target message to the service processing unit for processing through a netconf interface.

In the technical solutions provided by the examples of the present disclosure, an application service tunnel is used for communications between the network support module of the first device and the network service module of the second device. The application service tunnel is a logical link, and there is no need to maintain a specific physical tunnel between devices, which reduces the link maintenance cost. In addition, in the examples of the present disclosure, the general mechanism of the network device is reused during communications between devices, which greatly reduces the implementation cost of the technical solutions provided in the examples of the present disclosure.

In some examples, it is also provided a device management method, as shown in FIG. 6, which may include blocks S61-S65. Blocks S61-S64 are the same as the above-mentioned blocks S51-S54, and are not repeated here.

At block S65, the network service module of the first device sends a register event including the target device information to a cloud through a cloud pipeline, so that the cloud registers the second device by using the target device information, and establishes a connection with the second device after the second device is registered and a connection request sent by the second device through the cloud pipeline is received, wherein the connection request is a request periodically sent by the second device.

In this example of the present disclosure, the first device establishes a connection with the cloud through a cloud pipeline. The network service module of the first device sends a register event to the cloud through the cloud pipeline. After receiving the register event, the cloud extracts target device information from the register event, and registers the second device by using the target device information. In this way, the first device completes the registration of the second device to the cloud.

The first device does not need to notify the second device, and the network service module of the second device periodically sends a connection request to the cloud through the cloud pipeline to try to establish a connection with the cloud.

Before the second device is registered in the cloud, even if the cloud receives a connection request, it will not establish a connection with the second device. After the second device is registered in the cloud, when the cloud receives a connection request, it will establish a connection with the second device.

With reference to the architecture of the self-organizing network shown in FIG. 3, at block S65, it may be that: the service processing unit in the network service module of the first device sends a register event to the cloud through the cloud pipeline; and the service processing unit in the network service module of the second device periodically sends a connection request to the cloud through the cloud pipeline; after registering the second device, the cloud establishes a connection with the second device through the cloud pipeline according to the connection request.

In the technical solutions provided by the examples of the present disclosure, the master device registers the slave device to the cloud. The slave device periodically tries to establish a connection with the cloud, and automatically establishes a connection with the cloud after the master device registers the slave device to the cloud, realizing automatic cloud connection of the slave device, and then realizing remote operations of the master and slave devices in the self-organizing network through the cloud.

The device management method provided in the example of the present disclosure is described below in combination with the signaling diagram of automatic management, configuration synchronization and cloud connection shown in FIG. 7. In FIG. 7, the network service module of a new device (such as the above-mentioned second device) includes a service processing unit 12, the network support module of the new device includes a network architecture unit 13, and the network service module of the master device (such as the above-mentioned first device) includes a service processing unit 22, the network support module of the master device includes a network architecture unit 23. In this example of the present disclosure, the new device may refer to the above-mentioned second device, and the master device may refer to the above-mentioned first device, and the network support modules and network service modules of the new device and the master device may also include other units, as shown in FIG. 3 above, which are not limited.

At block S71, the network architecture unit 13 sends a discovery request to the network architecture unit 23.

At block S72, the network architecture unit 23 sends a management notification to the network architecture unit 13.

At block S73, the network architecture unit 23 sends a join event to the service processing unit 22, wherein the join event includes device information 1 of the new device.

At block S74, the service processing unit 22 acquires the corresponding configuration information 1 according to the device type in the device information 1.

At block S75, the service processing unit 22 invokes the interface of the application service tunnel to send the configuration information 1 to the network architecture unit 23.

At block S76, the network architecture unit 23 converts the configuration information 1 into an SOAP message 1.

At block S77, the network architecture unit 23 sends the SOAP message 1 to the service processing unit 12.

At block S78, the service processing unit 12 validates the configuration, that is, performs configuration by using the configuration information 1 in the SOAP message 1.

At block S79, the service processing unit 22 sends a register event 1 to the cloud through a cloud pipeline, wherein the register event 1 includes device information 1.

At block S710, the service processing unit 12 periodically sends a connection request to the cloud to realize automatic connection with the cloud.

In the technical solutions provided by the examples of the present disclosure, Fat APs, routers, switching devices and the like also support the function of the master device regardless of the device types thereof. Based on this, when there are only Fat APs, routers and switching devices in the network, plug-and-play of devices can still be achieved.

The description of the above blocks S71-S710 is relatively simple, and please refer to the relevant descriptions in the above-mentioned parts of FIG. 5 and FIG. 6 for details.

In some examples, an automatic management function may be provided on the master device. Taking the first device as the master device as an example, the first device can enable/disenable the automatic management function, that is, control the enabling of the automatic management function, to flexibly control the automatic management of the new device. The specific method can be as follows.

After receiving the discovery request, if the network support module of the first device has enabled the automatic management function, the network architecture unit in the network support module of the first device responds to the discovery request, that is, sends a management notification to the network support module of the second device, and sends a join event to the network service module of the first device.

If the network support module of the first device has not enabled the automatic management function, that is, has disenabled the automatic management function, the network architecture unit in the network support module of the first device refuses to respond to the discovery request, that is, does not send a management notification to the network support module of the second device, and does not send a join event to the network service module of the first device.

In the technical solutions provided by the examples of the present disclosure, the master device can limit accidental joining of devices not belong to this network through enabling/disenabling the automatic management function, which solves the problem of network information security reduction caused by the accidental joining of devices not belonging to this network.

In some examples, the master device may also be provided with an management whitelist. The management whitelist includes device information of devices that are allowed to access the self-organizing network.

Taking the first device as the master device as an example. In this example of the present disclosure, the first device may record a device list including device information of each device that has sent the discovery request. The user terminal checks the device information in the recorded device list through the network interaction module of the master device, and adds some or all of the device information in the device list to the management whitelist. In this example of the present disclosure, the user can also directly manually add or write device information in the management whitelist, which is not limited.

When the network support module of the first device does not enable the automatic management function, if the network architecture unit in the network support module of the first device detects that the management whitelist does not include the target device information, the network architecture unit in the network support module of the first device refuses to respond to the discovery request.

If the network architecture unit in the network support module of the first device has detected that the management whitelist includes the target device information, the network architecture unit in the network support module of the first device responds to the discovery request, that is, sends a management notification to the network support module of the second device, and sends a join event to the network service module of the first device.

In the technical solutions provided by the examples of the present disclosure, the master device can limit accidental joining of devices not belonging to this network through enabling/disenabling the automatic management function, which solves the problem of network information security reduction caused by the accidental joining of devices not belonging to this network. The management whitelist allows the network administrator to authorize the network to allow the joining of a specified device at any time, regardless of whether the new device has been plugged into the network at this time, whether it has been powered on or not. The combination of the automatic management function and the management whitelist can further improve the flexibility and security of plug-and-play of devices in the network.

In some examples, after the first device manages the second device, the second device is a slave device. In this case, an example of the present disclosure further provides a device management method, as shown in FIG. 8, which may include the following blocks.

At block S81, the network service module of the first device sends target page data provided by a network interaction module of the first device to the user terminal, so that the user terminal displays the target page data and performs an operation on the target page data to obtain second configuration information for the second device.

In this example of the present disclosure, the user terminal can access the network through any device that is a slave device or a master device. For example, a PC is inserted into any port of any switching device or a panel port of any panel AP, and the mobile phone accesses the network within a coverage area of any AP. Since the master device manages all slave devices, after accessing the network through any device, the user terminal can access the network interaction module of the master device, thereby manage all devices in the entire network.

In the example of the present disclosure, the user terminal enters the network interaction module of the first device, and the service processing unit in the network service module of the first device acquires page data (that is, the target page data) provided by the network interaction module of the first device, and sends the target page data to the user terminal. The user terminal displays the target page data, so that the user terminal accesses the web page of the first device. The user terminal performs an operation on the target page data to acquire the configuration information for the second device, such as second configuration information.

At block S82, the network service module of the first device receives the second configuration information sent by the user terminal, and sends the second configuration information to the network support module of the first device.

The service processing unit in the network service module of the first device receives the second configuration information sent by the user terminal, performs service identification and calculation on the second configuration information, and then sends the second configuration information to the network support module of the first device.

In an example, the second configuration information is an SOAP message, and the Webserver unit in the network service module of the first device receives the SOAP message, and transfers the SOAP message to the service processing unit for processing through the netconf interface. The service processing unit in the network service module of the first device invokes the interface of the application service tunnel to send the second configuration information to the network architecture unit in the network support module of the first device.

At block S83, the network support module of the first device sends the second configuration information to the network service module of the second device through the second tunnel, so that the network service module of the second device performs configuration by using the second configuration information.

After receiving the second configuration information, the network architecture unit in the network support module of the first device sends the second configuration information to the service processing unit in the network service module of the second device through the second tunnel. The service processing unit in the network service module of the second device performs configuration by using the received second configuration information, thereby realizing the synchronous configuration of the second device; in addition, the service processing unit in the network service module of the second device manages the entire network through the first device, that is, one-point login for the whole network management is realized, the usability of the self-organizing network is improved.

In some examples, in the above block S82 where the network service module of the first device sends the second configuration information to the network support module of the first device, it may be that: the network service module of the first device invokes the interface of the second tunnel to send the second configuration information to the network support module of the first device.

In this case, in the above block S83 where the network support module of the first device sends the second configuration information to the network service module of the second device through the second tunnel, it may be that: the network support module of the first device receives the second configuration information through the interface of the second tunnel; converts the second configuration information into a target message based on a preset protocol, and sends the target message to network service module of the second device. The preset protocol may be a general protocol between network devices, such as SOAP, etc. The network service module of the second device converts the target message into the second configuration information, and performs configuration by using the second configuration information.

With reference to the architecture of the self-organizing network shown in FIG. 3 described above, the service processing unit in the network service module of the first device invokes the interface of the second tunnel to send the second configuration information to the network support module of the first device. The network architecture unit of the network support module of the first device receives the second configuration information through the interface of the second tunnel; converts the second configuration information into an SOAP target message, and sends the target message to the network service module of the second device. The Webserver unit in the network service module of the second device receives the target message, and transfers the target message to the service processing unit for processing through a netconf interface.

In the technical solutions provided by the examples of the present disclosure, an application service tunnel is used for communications between the network support module of the first device and the network service module of the second device. The application service tunnel is a logical link, and there is no need to maintain a specific physical tunnel between devices, which reduces the link maintenance cost. In addition, in the examples of the present disclosure, the general mechanism of the network device is reused during communications between devices, which greatly reduces the implementation cost of the technical solutions provided in the examples of the present disclosure.

In some examples, it is also provided an interface access method, as shown in FIG. 9, which may include the following blocks.

At block S91, the network service module of the first device receives an access request sent by the user terminal, wherein the access request includes a target URL (Uniform Resource Locator).

The user terminal sends an access request to the first device. The service processing unit in the network service module of the first device receives the access request sent by the user terminal through a Webserver unit. The access request can be an SOAP message.

In the example of the present disclosure, the access request can be a request from the user terminal sent by the network support module of a third device in the self-organizing network through a third tunnel between the network support module of the third device and the network support module of the first device. The third tunnel is a tunnel between the network support module of the first device and the network support module of the third device, that is, the third tunnel is the third type of tunnel, namely a wireless AP management tunnel. In this example of the present disclosure, the third device is a managed device, such as the above-mentioned Fit AP or other managed APs.

The access request may also be a request from the user terminal sent by a cloud through a cloud pipeline.

In the example of the present disclosure, taking the user terminal as an APP as an example, the APP can implement an HTML5 architecture, and through the APP<-->cloud<-->cloud pipeline of the first device<-->the data channel of the Webserver unit of the first device, the APP sends an access request to the first device, and then obtains and displays a web page of the first device, constructs a data channel between the user terminal and the network interaction module of the first device, and regarding the subsequent interaction between the user terminal and the network service module and network support module of the first device, and the synchronization process of information such as the first configuration information and the second configuration information across devices, references can be made to the relevant descriptions in the above-mentioned parts of FIG. 5 to FIG. 8.

The access request may also be directly sent by the user terminal to the first device. For example, the user terminal accesses the network through the first device, and in this case, the user terminal directly sends the access request to the first device.

At block S92, the network service module of the first device acquires the target page data provided by the network interaction module of the first device when the target URL is the domain name of the self-organizing network.

The service processing unit in the network service module of the first device identifies that the target URL in the access request is the domain name of the self-organizing network, and acquires page data provided by the network interaction module of the first device, that is, target page data.

At block S93, the network service module of the first device carries the target page data in an access response to the access request, and feeds the access response back to the user terminal.

In the example of the present disclosure, the service processing unit of the network service module processes plug-and-play automatic synchronization configuration, automatic cloud connection, a global wireless service validating logic, a VLAN automatic adaptation logic of an Ethernet port, a global wired service validating logic and other service logic. After acquiring the target page data, the service processing unit in the network service module of first device carries the target page data in an access response corresponding to the access request, and feeds the access response back to the user terminal. The above access response may be an SOAP message.

In the technical solutions provided by the examples of the present disclosure, the above-mentioned blocks S91-S93 are used to realize the above-mentioned block S81. The management of the entire network requires the user terminals to access the master device. Taking a browser accessing the master device as an example, traditional IP addresses accessing local web pages are unfriendly to most users in the consumer market. In the example of this application, the user terminal only needs to access the network on any AP, and use the user terminal such as a mobile phone to access the specified domain name, and then the local web page of the master device can be opened to manage all the devices in the entire network, that is, the effect of "one-point login for the whole network management" is achieved, and the usability of the self-organizing network is improved.

In some examples, it is also provided an interface access method, as shown in FIG. 10, which may include the following blocks.

At block S101, the network service module of the first device receives a page request sent by the network support module of a fourth device in the self-organizing network through a fourth tunnel between the network support module of the fourth device and the network service module of the first device, wherein the page request is a request sent by the network service module of the fourth device to the first device after receiving the access request from the user terminal, wherein the target URL included in the access request is the domain name of the self-organizing network.

The fourth tunnel is a tunnel between the network support module of the fourth device and the network service module of the first device, that is, the fourth tunnel is the second type of tunnel described above, namely an application service tunnel.

The fourth device can be provided with a DNS (Domain Name System) hijacking function and a web proxy function.

The Webserver unit in the network service module of the fourth device receives the access request from the user terminal, and sends the access request to the service processing unit. The service processing unit uses the DNS hijacking function to identify that the target URL in the access request is the domain name of the self-organizing network, and sends a page request to the network architecture unit in the network support module of the fourth device. The network architecture unit in the network support module of the fourth device sends a page request to the network service module of the first device through the fourth tunnel.

At block S102, the network service module of the first device acquires target page data from the network interaction module of the first device according to the page request; sends the target page data to the network service module of the fourth device through a fifth tunnel between the network support module of the first device and the network service module of the fourth device, so that the network service module of the fourth device carries the target page data in the access response to the access request, and feeds the access response back to the user terminal.

The fifth tunnel is a tunnel between the network support module of the first device and the network service module of the fourth device, that is, the fifth tunnel is the second type of tunnel described above, namely an application service tunnel.

After receiving the page request from the fourth device, the service processing unit in the network service module of the first device acquires target page data such as HTML files, static resources, and data corresponding to the page from the network interaction module of the first device, and sends the target page data to the network support module of the first device; the network architecture unit in the network support module of the first device integrates the target page data and return it to the network service module of the fourth device through the fifth tunnel, and the service processing unit in the network service module of the fourth device returns the target page data to the user terminal. In this way, the whole network can be managed by accessing the master device web through the domain name.

In the technical solutions provided by the examples of the present disclosure, the above-mentioned blocks S101-S102 are used to realize the above-mentioned block S81. The management of the whole network requires the user terminal to access the master device. Taking a browser accessing the master device as an example, traditional IP addresses for accessing local web pages are unfriendly to most users in the consumer market. In the example of this application, the user terminal only needs to access the network on any AP, and use the user terminal such as a mobile phone to access the specified domain name, and then the local web page of the master device can be opened to manage all the devices in the entire network, that is, the effect of "one-point login for the whole network management" is achieved.

For some home routers, DNS hijacking is mostly used to realize the function of logging in local web pages through the domain name. However, there is a problem with the traditional DNS hijacking method: most wireless routers are used as a single device, which is a DHCP (Dynamic Host Configuration Protocol) server, and its own address generally does not change, while the master device of the self-organizing network may be generated by election, not necessarily the device where DHCP services are located, and the IP address of the master device may change. Once the IP address corresponding to the domain name changes, the browser may not be able to re-initiate the DNS request (that is, the access request) in time to acquire a new IP address corresponding to the domain name, which will make the page inaccessible.

In addition, in another implementation manner, the local web page is embedded with pages of other devices, but the embedding of pages will lead to very messy pages, limited embedded scope, and unfriendly to user terminal display.

The example of the present disclosure optimizes the method for managing the entire network, and each device adopts the form of DNS hijacking and web proxy, which can reduce the problem that the domain name cannot be accessed due to the change of the IP address of the master device.

First, the device accessed by the user terminal uses the DNS hijacking function, but for the resolved IP address for domain name, the IP address of the master device where the actual page is located is no longer returned, but instead the IP address of the device accessed by the user terminal itself is returned. Because if the devices such as AP or switching device accessed by the user terminal go down, the user terminal will be disconnected, and the device accessed by the user terminal will most likely be assigned with the last used IP address after it works again. However, once the master device goes down, according to the above-mentioned device role election mechanism in the example of the present disclosure, the slave device will be upgraded as the master device, and the IP address of the master device will inevitably change. Therefore, by adopting the technical solutions provided by the examples of the present disclosure, the probability of changing the IP address corresponding to the domain name is reduced, and the probability that the user terminal cannot access the master device page through the domain name is reduced.

Second, the master-slave device is additionally provided with a web proxy function. When a user accesses a local web page through a domain name, the AP or switching device and other slave devices receive the access request, identify that the URL of the access request is the domain name of the self-organizing network, then a same page request is sent to the network service module of the master device through the network support module. After receiving the page request from the slave device, the network service module of the master device returns the target page data to the network service module of the slave device through the network support module of the master device, and the slave device integrates the target page data from the master device and returns it to the user terminal. In this way, the whole network can be managed by accessing the master device web page through the domain name.

The interface access method provided in the example of the present disclosure is described below in combination with the signaling diagram of the slave device accessing the master device web page shown in FIG. 11. In FIG. 11, the network service module of the slave device includes a Webserver unit 31 and a service processing unit 32, the network support module of the slave device includes a network architecture unit 33, and the network service module of the master device includes a service processing unit 41, the network support module of the master device includes a network architecture unit 42, and the network interaction module of the master device includes a local web 43. In this example of the present disclosure, the slave device may refer to the above-mentioned fourth device, and the master device may refer to the above-mentioned first device, and the network support modules, network service modules and network interaction modules of the slave device and the master device may also include other units, as shown in FIG. 3 above, which are not limited.

At block S111, after the slave device is managed, the network architecture unit 33 configures the DNS hijacking function in the service processing unit 32, and the domain name is configured as the IP address of the slave device itself.

At block S112, the Webserver unit 31 receives an access request sent by the user terminal.

At block S113, the Webserver unit 31 sends the access request to the service processing unit 32.

At block S114, the service processing unit 32 invokes the interface of the application service tunnel to send a page request to the network architecture unit 33.

At block S115, the network architecture unit 33 converts the page request into an SOAP message 2.

At block S116, the network architecture unit 33 sends the SOAP message 2 to the service processing unit 41.

At block S117, the service processing unit 41 acquires the page data 1 of the local web 43 according to the SOAP message 2.

At block S118, the service processing unit 41 invokes the interface of the application service tunnel to send the page data 1 to the network architecture unit 42.

At block S119, the network architecture unit 42 converts the page data 1 into the SOAP message 3.

At block S1110, the network architecture unit 42 sends the SOAP message 3 to the service processing unit 32.

At block S1111, the service processing unit 32 sends the page data 1 corresponding to the SOAP message 3 to the Webserver unit 31.

At block S1112, the Webserver unit 31 feeds the page data 1 back to the user terminal.

The description of the above blocks S111-S1112 is relatively simple, and please refer to the relevant descriptions in the above-mentioned parts of FIG. 5 and FIG. 10 for details.

Corresponding to the above device management method, an example of the present disclosure further provides a network device, as shown in FIG. 12, which includes: a first network support module 121 and a first network service module 122.

The first network support module 121 is to: when the network device is a master device of a self-organizing network, receive, through a first tunnel between first network support module and a network support module of a second device in the self-organizing network, a discovery request sent by the network support module of the second device, wherein the discovery request includes target device information of the second device;

the first network support module 121 is to send a management notification to the network support module of the second device through the first tunnel, and send a join event to the first network service module, wherein the join event includes the target device information;

the first network service module 122 is to acquire first configuration information matching the target device information, and send the first configuration information to the first network support module;

the first network support module 121 is to send the first configuration information to a network service module of the second device through a second tunnel between first network support module and the network service module of the second device, so that the network service module of the second device performs configuration by using the first configuration information when the network support module of the second device receives the management notification.

In some examples, the first network service module 122 is specifically to invoke an interface of the second tunnel to send the first configuration information to the first network support module;

the first network support module 121 is specifically to receive the first configuration information through the interface of the second tunnel between the first network support module and the network service module of the second device; convert the first configuration information into a target message based on a preset protocol, and send the target message to the network service module of the second device, so that the network service module of the second device converts the target message into the first configuration information and performs configuration by using the first configuration information when the network support module of the second device receives the management notification.

In some examples, the preset protocol may be an SOAP.

In some examples, the first network service module 122 may be further to send a register event including the target device information to a cloud through a cloud pipeline after the first network support module sends the first configuration information to the network service module of the second device, so that the cloud registers the second device by using the target device information, and establishes a connection with the second device after the second device is registered and a connection request sent by the second device through the cloud pipeline is received, wherein the connection request is a request periodically sent by the second device, and the cloud pipeline is a connection established between the first network service module and the cloud.

In some examples, the first network support module 121 may be further to:

after receiving the discovery request, if an automatic management function has been enabled, send a management notification to the network support module of the second device, and send a join event to the first network service module;

if the automatic management function has not been enabled, refuse to respond to the discovery request.

In some examples, the first network support module 121 may also be to:

when the automatic management function has not enabled, if a management whitelist does not include the target device information, refuse to respond to the discovery request, wherein the management whitelist includes device information of devices that are allowed to access the self-organizing network;

if the management whitelist includes the target device information, send a management notification to the network support module of the second device, and send a join event to the first network service module.

In some examples, the network device may further include: a first network interaction module 123, as shown in FIG. 13.

The first network service module 122 may be further to send target page data provided by a first network interaction module to a user terminal, so that the user terminal displays the target page data and performs an operation on the target page data to obtain second configuration information for the second device.

The first network service module 122 may be further to receive second configuration information sent by the user terminal, and send the second configuration information to the first network support module.

The first network support module 121 may be further to send the second configuration information to the network service module of the second device through the second tunnel, so that the network service module of the second device performs configuration by using the second configuration information.

In some examples, the first network service module 122 may be specifically to:

receive an access request sent by the user terminal, wherein the access request includes a target URL;

when the target URL is a domain name of the self-organizing network, acquire target page data provided by the first network interaction module 123;

carry the target page data in an access response to the access request, and feed the access response back to the user terminal.

In some examples, the access request may be a request from the user terminal sent by a network support module of a third device in the self-organizing network through a third tunnel between the network support module of the third device and the first network support module; or the access request may be a request from the user terminal sent by a cloud through a cloud pipeline.

In some examples, the first network service module 122 may be specifically to:

receive a page request sent by a network support module of a fourth device in the self-organizing network through a fourth tunnel between the network support module of the fourth device and the first network service module, wherein the page request is a request sent by a network service module of the fourth device to the network device after receiving an access request from the user terminal, wherein the target URL included in the access request is a domain name of the self-organizing network;

acquire the target page data from the first network interaction module according to the page request; send the target page data to the network service module of the fourth device through a fifth tunnel between the first network support module and the network service module of the fourth device, so that the network service module of the fourth device carries the target page data in an access response to the access request, and feeds the access response back to the user terminal.

In some examples, the first network support module 121 may be further to perform a second-layer negotiation with a network support module of another device through a sixth tunnel between the first network support module and the network support module of the another device, and determine a role of each of the network device and the another device in the self-organizing network, wherein the role is the master device or a slave device.

In the technical solutions provided by the examples of the present disclosure, after a new device is accessed to the network when powered on, the interaction between the network support module of the new device and the network support module of the master device and the interaction between the network support module and the network service module of the master device realizes the automatic management and automatic synchronization configuration of the new device, which solves the problem of being unable to be on duty on the network 24 hours a day. In addition, since the master device manages all slave devices, such as new devices, after the user terminal accesses the network through any device, it can access the master device and manage all devices in the entire network, realizing the management of the entire network.

An example of the present disclosure further provides a network device, as shown in FIG. 14, including a processor 114 and a machine-readable storage medium 142, where the machine-readable storage medium 142 stores machine executable instructions that can be executed by the processor 141 and cause the processor to implement method shown in any of the examples in FIG. 5 to FIG. 11.

In the example of the present disclosure, the above-mentioned network support module, the network service module and the network interaction module may be implemented by the machine executable programs or instructions, and the processor 141 executes corresponding machine executable programs or instructions, which can implement the above-mentioned functions of the network support module, network service module and the network interaction module, and then implement method shown in any of the examples in FIG. 5 to FIG. 11.

The example of the disclosure further provides a machine-readable storage medium storing computer programs thereon which, when executed by a processor, cause the processor to implement method shown in any of the examples in FIG. 5 to FIG. 11.

The example of the present disclosure further provides a computer program which, when executed by a processor, causes the processor to implement method shown in any of the examples in FIG. 5 to FIG. 11.

The machine-readable storage medium can include a random access memory (RAM), or can include a non-volatile memory (NVM), for example at least one disk memory. In an example, the machine-readable storage medium can also be at least one storage device located away from the processor described above.

The aforementioned processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

In the aforementioned examples, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the examples of the present disclosure is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as an integrated server or data center containing one or more available medium. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, so that processes, methods, articles, or devices including a series of elements include not only those elements listed but also those not specifically listed or elements intrinsic to these processes, methods, articles, or device. Without further limitations, elements defined by the sentences "comprise(s) a . . . " or "include(s) a . . . " do not exclude that there are other identical elements in the processes, methods, articles, or devices which include these elements.

All the examples are described in corresponding ways, same or similar parts in each of the examples can be referred to one another, and the parts emphasized are differences from other examples. For examples of the network device, machine-readable storage medium and computer program, since they are similar to the examples of the method, the description thereof is relatively simple; the relating parts could refer to the parts of the description of examples of the method.

The examples described above are merely preferred examples of the present disclosure, and not intended to limit the scope of the present disclosure. Any modifications, equivalents, improvements or the like within the spirit and principle of the disclosure should be included in the scope of the disclosure.

What is claimed is:

1. A device management method, which is applied to a first device in a self-organizing network and comprises:
   when the first device is a master device, a network support module of the first device receiving, through a first tunnel between the network support module of the first device and a network support module of a second device in the self-organizing network, a discovery request sent by the network support module of the second device, wherein the discovery request comprises target device information of the second device;
   the network support module of the first device sending a management notification to the network support module of the second device through the first tunnel, and sending a join event to a network service module of the first device, wherein the join event comprises the target device information;
   the network service module of the first device acquiring first configuration information matching the target device information, and sending the first configuration information to the network support module of the first device;
   the network support module of the first device sending the first configuration information to a network service module of the second device through a second tunnel between the network support module of the first device and the network service module of the second device, so that the network service module of the second device performs configuration by using the first configuration information when the network support module of the second device receives the management notification.

2. The method of claim 1, wherein the network service module of the first device sending the first configuration information to the network support module of the first device, comprises:
   the network service module of the first device invoking an interface of the second tunnel to send the first configuration information to the network support module of the first device;
   the network support module of the first device sending the first configuration information to the network service module of the second device through the second tunnel between the network support module of the first device and the network service module of the second device, comprises:

the network support module of the first device receiving the first configuration information through the interface of the second tunnel between the network support module of the first device and the network service module of the second device; converting the first configuration information into a target message based on a preset protocol, and sending the target message to the network service module of the second device, so that the network service module of the second device converts the target message into the first configuration information and performs configuration by using the first configuration information when the network support module of the second device receives the management notification.

3. The method of claim 2, wherein the preset protocol is a simple object access protocol.

4. The method of claim 1, wherein after the network support module of the first device sends the first configuration information to the network service module of the second device, the method further comprises:

the network service module of the first device sending a register event comprising the target device information to a cloud through a cloud pipeline, so that the cloud registers the second device by using the target device information, and establishes a connection with the second device after the second device is registered and a connection request sent by the second device through the cloud pipeline is received, wherein the connection request is a request periodically sent by the second device, and the cloud pipeline is a connection established between the network service module of the first device and the cloud.

5. The method of claim 1, wherein after receiving the discovery request, the method further comprises:

if an automatic management function has been enabled, the network support module of the first device performing operations of sending a management notification to the network support module of the second device, and sending a join event to the network service module of the first device;

if the automatic management function has not been enabled, the network support module of the first device refusing to respond to the discovery request.

6. The method of claim 5, wherein when the network support module of the first device has not enabled the automatic management function, the method further comprises:

if a management whitelist does not comprise the target device information, the network support module of the first device performing an operation of refusing to respond to the discovery request, wherein the management whitelist comprises device information of devices that are allowed to access the self-organizing network;

if the management whitelist comprises the target device information, the network support module of the first device performing operations of sending a management notification to the network support module of the second device, and sending a join event to the network service module of the first device.

7. The method of claim 1, further comprising:

the network service module of the first device sending target page data provided by a network interaction module of the first device to a user terminal, so that the user terminal displays the target page data and performs an operation on the target page data to obtain second configuration information for the second device;

the network service module of the first device receiving the second configuration information sent by the user terminal, and sending the second configuration information to the network support module of the first device;

the network support module of the first device sending the second configuration information to the network service module of the second device through the second tunnel, so that the network service module of the second device performs configuration by using the second configuration information.

8. The method of claim 7, wherein the network service module of the first device sending the target page data provided by the network interaction module of the first device to the user terminal, comprises:

the network service module of the first device receiving an access request sent by the user terminal, wherein the access request comprises a target URL;

the network service module of the first device acquiring the target page data provided by the network interaction module of the first device when the target URL is a domain name of the self-organizing network;

the network service module of the first device carrying the target page data in an access response to the access request, and feeding the access response back to the user terminal.

9. The method of claim 8, wherein the access request is a request from the user terminal sent by a network support module of a third device in the self-organizing network through a third tunnel between the network support module of the third device and the network support module of the first device; or the access request is a request from the user terminal sent by a cloud through a cloud pipeline.

10. The method of claim 7, wherein the network service module of the first device sending the target page data provided by the network interaction module of the first device to the user terminal, comprises:

the network service module of the first device receiving a page request sent by a network support module of a fourth device in the self-organizing network through a fourth tunnel between the network support module of the fourth device and the network service module of the first device, wherein the page request is a request sent by a network service module of the fourth device to the first device after receiving an access request from the user terminal, wherein the target URL comprised in the access request is a domain name of the self-organizing network;

the network service module of the first device acquiring the target page data from the network interaction module of the first device according to the page request; sending the target page data to the network service module of the fourth device through a fifth tunnel between the network support module of the first device and the network service module of the fourth device, so that the network service module of the fourth device carries the target page data in an access response to the access request, and feeds the access response back to the user terminal.

11. The method of claim 1, comprising:

the network support module of the first device performing a second-layer negotiation with a network support module of another device in the self-organizing network through a sixth tunnel between the network support module of the first device and the network support module of the another device, and determining a role of each of the first device and the another device in the self-organizing network, wherein the role is the master device or a slave device.

12. A network device, comprising a processor and a non-transitory machine-readable storage medium, where the network device is used as a first device in a self-organizing network, and the non-transitory machine-readable storage medium stores machine executable instructions that can be executed by the processor and cause the processor to implement a device management method of claim 1, comprising:

when the first device is a master device, a network support module of the first device receiving, through a first tunnel between the network support module of the first device and a network support module of a second device in the self-organizing network, a discovery request sent by the network support module of the second device, wherein the discovery request comprises target device information of the second device;

the network support module of the first device sending a management notification to the network support module of the second device through the first tunnel, and sending a join event to a network service module of the first device, wherein the join event comprises the target device information;

the network service module of the first device acquiring first configuration information matching the target device information, and sending the first configuration information to the network support module of the first device;

the network support module of the first device sending the first configuration information to a network service module of the second device through a second tunnel between the network support module of the first device and the network service module of the second device, so that the network service module of the second device performs configuration by using the first configuration information when the network support module of the second device receives the management notification.

13. A non-transitory machine-readable storage medium, wherein the machine-readable storage medium stores a computer program thereon which, when executed by a processor, causes the processor to implement the method of claim 1.

* * * * *